(No Model.)

C. G. PETZOLD.
PATTERN CHAIN FOR LOOMS.

No. 427,010. Patented Apr. 29, 1890.

UNITED STATES PATENT OFFICE.

CHARLES G. PETZOLD, OF LAWRENCE, MASSACHUSETTS, ASSIGNOR OF ONE-HALF TO THE ARLINGTON MILLS, OF SAME PLACE.

PATTERN-CHAIN FOR LOOMS.

SPECIFICATION forming part of Letters Patent No. 427,010, dated April 29, 1890.

Application filed March 2, 1889. Serial No. 301,785. (No model.)

*To all whom it may concern:*

Be it known that I, CHARLES G. PETZOLD, of Lawrence, county of Essex, State of Massachusetts, have invented an Improvement in Pattern-Chains for Looms, of which the following description, in connection with the accompanying drawings, is a specification, like letters on the drawings representing like parts.

Pattern-chains for looms as heretofore constructed have been composed of a series of transverse parallel rods or bars, upon which are loosely placed the rolls and the sleeves separating them, the said rods or bars being loosely connected by links. These links have been composed of pieces of metal cut out of a sheet or plate, and in practice the opposite ends of the links are connected to adjacent bars, the links falling outside of the flanges of the pattern-chain wheel, while the roller-separating sleeves have been extended to the links and bear on the flanges of the said wheel. By such construction undue wear is brought on the links and they frequently have to be replaced; and so, also, the links, being thin and having but a small bearing-surface to come against the rods or bars, wear away the said rods or bars, so that the rods are loosely held, and by reason of such wear the chain is gradually lengthened, thereby throwing the bar out of position, to be taken up properly by the chain-wheel and causing breakages on the loom and serious damage to the goods being woven.

My invention has for its object to produce a pattern-chain to obviate the said defects.

My invention consists, essentially, in a pattern-chain consisting of parallel rods or bars, roller-separating sleeves thereon, rollers carried by said sleeves, and links having hubs or bosses provided with rod-receiving holes and arranged reversely on the rods or bars in succession, the hubs of one link being turned toward or in contact with those of the next link to form bearings for the chain, substantially as will be described. The links thus formed are placed on the ends of the rods or bars in reverse position, or so that the hubs or bosses thereof will contact with each other, and when placed on the rods or bars in such position the hubs or bosses constitute the bearings to come in contact with the flanges of the wheel, while the successive links of the series lie at opposite sides of the said flanges.

Figure 1:
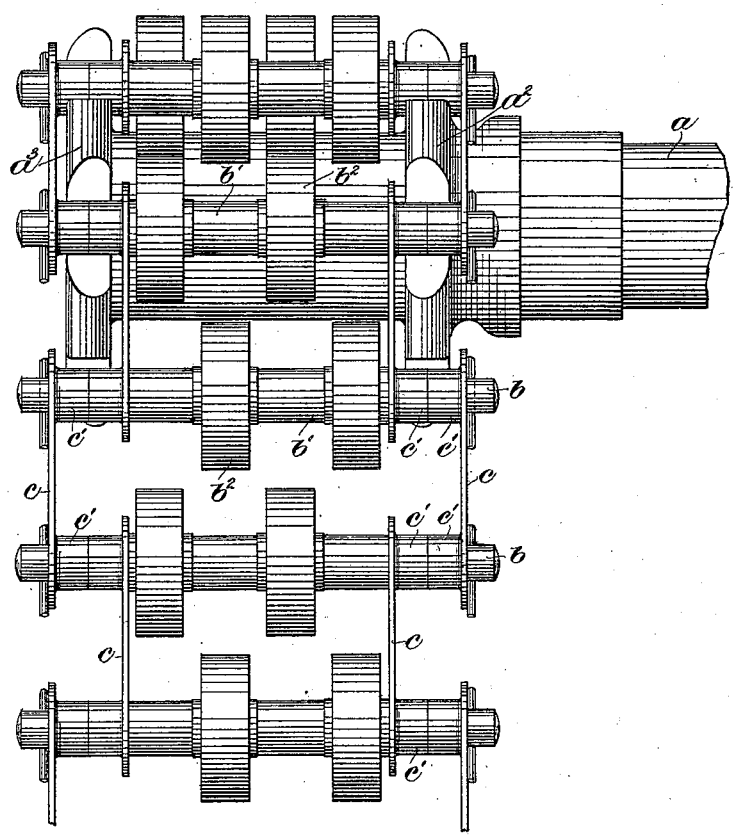
Figure 2:
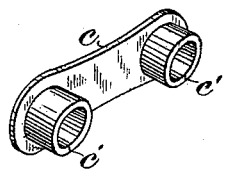

Figure 1 shows in front elevation a portion of a pattern-chain and one of the pattern-chain wheels, and Fig. 2 a perspective view of one of the links removed.

The pattern-chain wheel, comprising the shaft $a$ and notched flanges $a^2$ $a^3$, is of any usual or suitable construction.

The pattern-chain comprises a series of parallel rods or bars $b$, transversely arranged, each rod or bar having arranged on it one or more sleeves, as $b'$, carrying rollers $b^2$, variously arranged for different patterns. The sleeves $b'$ terminate inside of or within the flanges $a^2$ $a^3$. The links connecting the rods or bars $b$ consist each of a flat piece of metal or body portion $c$, having at each end a hub or boss $c'$, having a hole through it to constitute a bearing for the rod $b$, which is extended laterally from the body thereof. The holes formed through the hubs or bosses $c'$ are of sufficient size to receive the ends of the rods or bars $b$. The links thus formed are placed on the rods or bars in such manner, as shown in Fig. 1, that the hubs or bosses of one link are directed toward or come in contact with the hubs or bosses of the next link, and so on. The links thus arranged on the rods or bars present bearings which contact with the flanges $a^2$ $a^3$, the bodies of the links occupying a position, one at the outside of the flange and the next link at the inside of the flange in succession. It will be seen that the links herein shown possess large bearing-surfaces in contact with the rod or bar, thereby greatly reducing the wear of both the rod or bar and the link.

I claim—

The flanged pattern-chain wheel, combined with the pattern-chain herein described, consisting of the parallel rods or bars $b$, the roller-separating sleeves thereon terminating inside the flanges of the pattern-chain wheel, the rollers carried by said sleeves, and the links $c$, having hubs or bosses $c'$, provided with rod-receiving holes and arranged reversely on the rods or bars in succession, the hubs of one link being turned toward or in contact with those of the next link to form bearings for the chain, the bodies of the alternate links being on opposite sides of the flanges of said pattern-chain wheel, substantially as and for the purpose specified.

In testimony whereof I have signed my name to this specification in the presence of two subscribing witnesses.

CHARLES G. PETZOLD.

Witnesses:
LIZZIE JENKINS,
ADOLF P. VORHOLZ.